United States Patent [19]

Hashimoto

[11] Patent Number: 4,475,825

[45] Date of Patent: Oct. 9, 1984

[54] NON-IMPACT PRINTING APPARATUS

[75] Inventor: Kenichiro Hashimoto, Yokohama, Japan

[73] Assignee: Canon Kabushiki Kaisha, Tokyo, Japan

[21] Appl. No.: 408,593

[22] Filed: Aug. 16, 1982

[30] Foreign Application Priority Data

Aug. 31, 1981 [JP] Japan ............................... 56-135596

[51] Int. Cl.[3] ........................ G01D 15/10; B41J 12/02

[52] U.S. Cl. ............................... 400/120; 346/76 PH; 400/636

[58] Field of Search .............. 400/120, 58, 158, 158.1, 400/159, 636; 346/76 PH

[56] References Cited

U.S. PATENT DOCUMENTS 4,327,366 4/1982 Schafter et al. ..................... 400/120

4,350,987 9/1982 Hanagata et al. .................. 400/120

4,379,646 4/1983 Maeda ................................ 400/120

*Primary Examiner*—E. H. Eickholt

*Attorney, Agent, or Firm*—Fitzpatrick, Cella, Harper & Scinto

[57] ABSTRACT

The invention provides a non-impact printing apparatus wherein a printing head is moved along the direction of width of a recording paper sheet while the printing head is press-contacting the recording paper sheet. The printing apparatus has a means for press-contacting the recording paper sheet with the printing head and a paper feeding means. When the printing head is moved within a predetermined range which is narrower than a printing range, paper feeding is performed. A press-contacting means is biased by a biasing means such that the center of pressure of the press-contacting means is substantially at the center of the predetermined range of the printing head.

7 Claims, 10 Drawing Figures

NON-IMPACT PRINTING APPARATUS

BACKGROUND OF THE INVENTION

1. Field of the Invention

The present invention relates to a non-impact printing apparatus and, more particularly, to a non-impact printing apparatus for printing characters by press-contacting a printing head on a recording paper sheet as the printing head is moved along the direction of width of the recording paper sheet.

2. Description of the Prior Art

In conventional non-impact printing apparatuses such as a thermal printer, the printing head is press-contacted on the recording paper sheet while the recording paper sheet is fed through. As a result, various problems occur.

SUMMARY OF THE INVENTION

It is, therefore, an object of the present invention to provide a non-impact printing apparatus which is capable of properly feeding a recording paper sheet when a printing head is press-contacted on the recording paper sheet and is simultaneously moved along the direction of width of the recording paper sheet.

It is another object of the present invention to provide a non-impact printing apparatus wherein the recording paper sheet may not be obliquely fed and the right and left portions of the recording paper sheet are uniformly fed.

It is still another object of the present invention to provide a non-impact printing apparatus which has a simple construction.

It is still another object of the present invention to provide a non-impact printing apparatus wherein a moving range or moving distance of the printing head prior to carriage return for feeding the paper sheet can be changed without sacrificing normal paper feeding.

It is still another object of the present invention to provide a non-impact printing apparatus of serial type with a simple structure.

Other objects, features and advantages of the present invention will be apparent from the following detailed description taken in conjunction with the accompanying drawings.

DETAILED DESCRIPTION OF THE PREFERRED EMBODIMENTS

Figure 1:
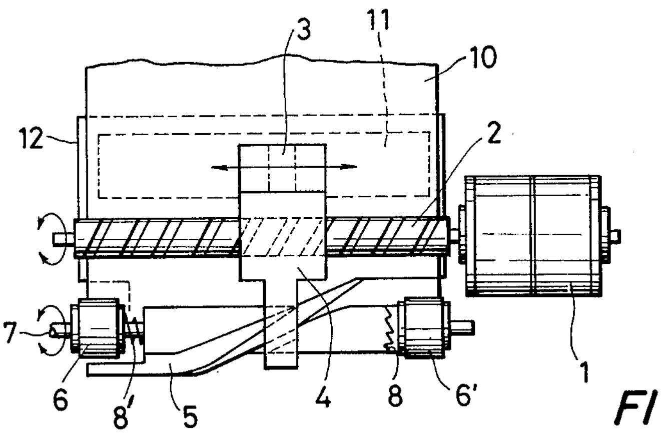
FIG. 1 is a schematic view of a printing apparatus to which the present invention is applied.
Figure 2:
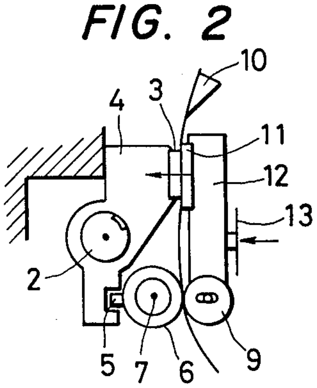
FIG. 2 is a schematic view for explaining a mechanism for providing a printing pressure and a roller pressure in the apparatus shown in FIG. 1.
Figure 3:
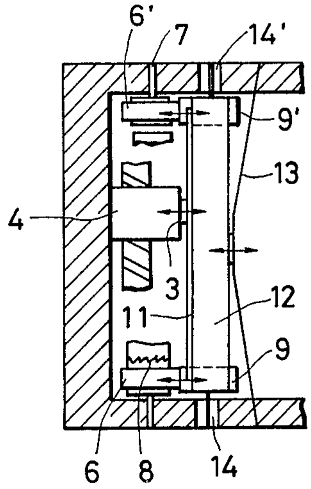
FIG. 3 is a partial plan view of the printing apparatus to explain a spring pressure acting on a platen holder.

A printing apparatus to which the present invention is applied will be described with reference to FIGS. 1 to 3.

Figure 4A:
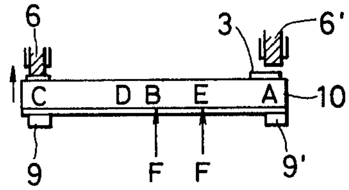
FIGS. 4A and 4B show plane and perspective views, respectively for explaining the mode of operation between the spring pressure and the displacement of the platen holder.
Figure 4B:
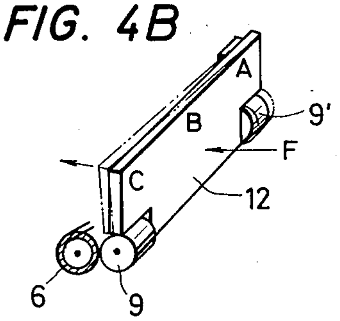
Figure 5:
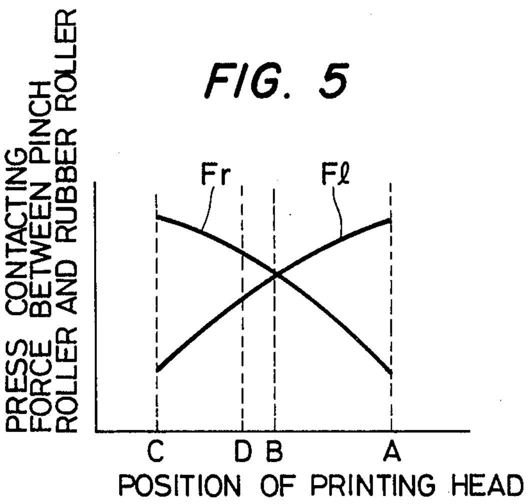
FIGS. 5 and 6 are graphs for explaining the press-contacting force between the pinch roller and the rubber roller as a function of the position of the printing head.

A motor 1 which supplies power of the printing apparatus as a whole may comprise a pulse motor. The rotational force of the motor 1 is transmitted to a lead screw 2 which is fixed to the rotating shaft of the motor 1. Since the male threads of the lead screw 2 engage with the female threads of a carriage 4 which has a printing head 3 for printing characters on a printing paper sheet 10, the rotational movement of the lead screw 2 is converted to the horizontal movement of the carriage 4 along the direction of width of the printing paper sheet 10. The printing head 3 is heated at a desired position of the paper sheet 10 and prints a character at that position of the paper sheet 10. Further, since the groove at the lower portion of the carriage 4 engages with an elongated helical projection of a cam 5, the cam 5 is rotated upon horizontal movement of the carriage 4. Rubber rollers 6 and 6′ for feeding the paper sheet are respectively mounted on a shaft 7 at two ends of the cam 5. The cam 5 is not fixed on the shaft 7. When the carriage 4 is moved toward the motor 1, that is, only when the carriage return is performed, the rubber rollers 6 and 6′ are rotated by a ratchet mechanism consisting of a ratchet 8 and spring 8′ which transmits power in one direction between the rubber roller 6 and the cam 5. The paper sheet 10 which is held between rubber rollers 6 and 6′ and pinch rollers 9 and 9′ is then fed. The press-contacting force between a platen 11 and the printing head 3, that is, a printing pressure, and the press-contacting forces between the pinch rollers 9 and 9′ and the rubber rollers 6 and 6′ are obtained by applying a force to a platen holder 12 from the side opposite to the printing head 3 by means of a leaf spring 13. The platen holder 12 holds the pinch rollers 9 and 9′ and the platen 11, and functions as a means for pressing the recording paper sheet. Bearings 14 and 14′ of the platen holder 12 are elongated holes, so that the pinch rollers 9 and 9′ are urged against the rubber rollers 6 and 6′ and the pressure is applied to the center of the platen holder 12 to balance the right and left printing pressures, so that the printing pressure can be properly distributed to the printing head and the pinch rollers. However, when the pressure is applied as described above and when the printing head 3 is located in portion A as shown in FIGS. 4A and 4B, portion C which opposes the printing head 3 is rotated about portion A in the direction indicated by the arrow due to the moments of the force, since a pressure F of the leaf spring 13 is applied to the center of the platen 11, that is, to portion B. As a result, the press-contacting force between the pinch roller 9′ and the rubber roller 6′ which diagonally oppose the portion C is weaker than that between the pinch roller 9 and the rubber roller 6. In the printing range between the portions A and B, the press-contacting forces at the two ends of the printing paper sheet differ. FIG. 5 shows changes in the press-contacting force between the rubber roller and the pinch roller with respect to the position of the printing head. If the press-contacting force between the rubber roller and the pinch roller is weak, slippage occurs when the printing paper sheet is fed. Therefore, the paper sheet cannot be fed at the proper pitch. When the paper sheet is fed while printing takes place in the printing range between the portions A and C as shown in FIG. 5, a press-contacting force Fl between the rubber roller 6 and the pinch roller 9 differs from a press-contacting force Fr between the rubber roller 6' and the pinch roller 9'. However, the press-contacting force Fl may be equal to the press-contacting force Fr when the forces are integrated as a function of the positions of the printing head 3. Therefore, when the operator presses the carriage return once, the slippage amount of the paper sheet at its two ends becomes equal. However, for simply feeding the paper sheet without printing, the printing head 3 must be reciprocated over the entire width of the platen 11, that is, over the entire printing range. Printing of the next character is time consuming. Further, even if the operator wishes to print characters only half-way along to the center of the possible printing range, the printing head must be reciprocated for paper sheet feeding over the entire printing range. Thus, the printing speed is decreased.

If the printing head is moved half-way along the printing range and returns to the left-hand margin at a predetermined pitch, the printing speed may not be decreased.

For this purpose, the helical portion (used for paper feeding) of the cam 5 is shortened. For example, as shown in FIGS. 4 and 5, if the helical portion of the cam 5 is formed only between the portion A and portion D, the integrated value of the press-contacting force between the rubber roller 6 and the pinch roller 9 differs from that of the press-contacting force between the rubber roller 6' and the pinch roller 9', and the feeding pitches at the right and left sides of the printing paper sheet differ from each other. As a result, the printing paper sheet is fed obliquely.

Figure 6:
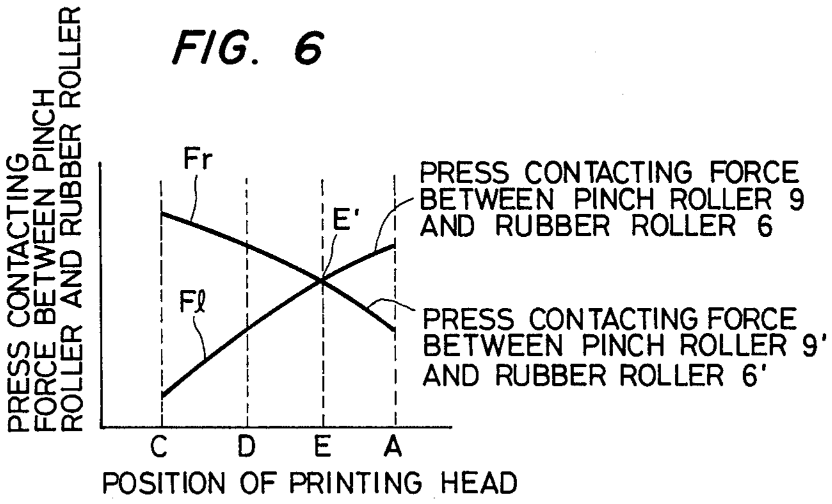
Figure 7:
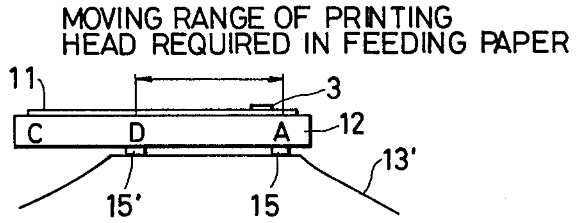
FIG. 7 is a schematic view showing part of a printing apparatus according to an embodiment of the present invention.

For feeding the printing paper sheet when printing is performed in the range between the portions A and D, the press-contacting position of the leaf spring 13, that is, the pressure center is defined as a central point E of the range between the portions A and D as shown in FIG. 4 in order to equalize the integrated values of the press-contacting forces of the right rubber roller and the right pinch roller, and of the left rubber roller and the left pinch roller. As shown in FIG. 6, paper feeding can be properly performed. A stabilized point E' of each pair of rubber and pinch rollers is positioned as the central point E.

According to another embodiment of the present invention, projections 15 and 15' formed at the portions A and D, respectively, contact a leaf spring 13'. Displacement of the platen 11 relative to displacement of the carriage can be minimized by urging the platen 11 with the leaf spring 13'. In this case, the graph (FIG. 6) for explaining the press-contacting forces between the pinch rollers and the rubber rollers as a function of the position of the printing head can, of course, be applied. However, in this case, the curve is not steeper than that in FIG. 6. In other words, the press-contacting force between one pair of rollers does not greatly differ from that between the other pair of rollers.

Figure 8:
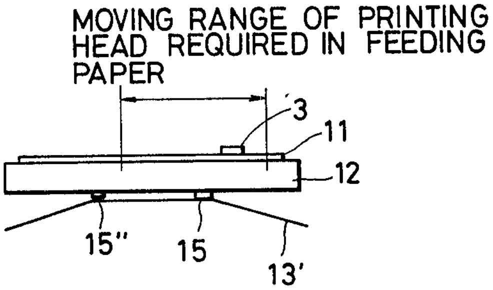
FIG. 8 is a schematic view of a modification of the part of the printing apparatus shown in FIG. 7.

The points where the pressures are applied to the platen 11 are symmetrical about the center thereof. When different pressures are applied to the two points, the same effect can be obtained in the same manner as in the case where the position of the central point E shown in FIGS. 4 and 5 is changed. For this purpose, the heights as shown in FIG. 8 of the projections 15,15 differ from each other, and the pressures acting on the platen holder 12 of the leaf spring 13' are changed.

Figure 9:
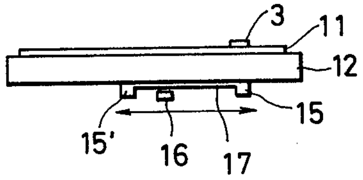
FIG. 9 is a schematic view of part of a printing apparatus according to another embodiment of the present invention.

FIG. 9 shows a fine-adjustment mechanism. Projections 15 and 15' are integrally formed with a slide body 17 which is supported by a guide 16 to be slidable along the platen holder 12, so that the press-contacting force of one pair of rollers can be fine-adjusted relative to that of the other pair of rollers.

The present invention is not limited to the above embodiments. Various types of biasing means such as magnets which repel each other may be used in place of the leaf springs 13 and 13'. Further, a smooth circular projection may be integrally formed on the platen holder 12 in place of the pinch roller 9.

What is claimed is:

1. An non-impact printing apparatus, comprising:
 a printing head for printing characters on a recording paper sheet by reciprocating said printing head along a direction of width of the recording paper sheet;
 paper feeding means being disposed in the direction of width of the recording paper sheet for feeding the recording paper sheet when said printing head is operated within a predetermined range which is narrower than a printing range of said printing head;
 means having a width larger than the printing range of said printing head, and being disposed to oppose said paper feeding means and said printing head for press-contacting the recording paper sheet with said printing head and said paper feeding means; and
 means for biasing said press-contacting means toward said printing head and said paper feeding means to define a center of pressure at substantially a center of a range of said press-contacting means which range corresponds to the predetermined range of said printing head.

2. An apparatus according to claim 1, wherein said biasing means contacts two ends of the range which corresponds to the predetermined range of said printing head, and biases said press-contacting means.

3. An apparatus according to claim 1, wherein said press-contacting means has projections which contact said biasing means, and said projections being symmetrical about a center of said press-contacting means and being different in height therefrom.

4. An apparatus according to claim 1, further comprising means slidably mounted on said press-contacting means to be in contact with said biasing means, for transmitting a biasing force with a desired distribution to said press-contacting means.

5. A non-impact printing apparatus, comprising:
 a printing head for printing characters on a recording paper sheet by moving said printing head along a direction of width of the recording paper sheet when said printing head press-contacts the recording paper sheet;
 means for reciprocally moving said printing head along the direction of width of the recording paper sheet in a first recording range, said means being capable of reciprocally moving said printing head within a second recording range smaller than the first recording range when said printing head press-contacts the recording paper sheet; and
 means for feeding the recording paper sheet in a direction perpendicular to the direction of width of the recording paper sheet, and adapted to be connected to said printing head, said feeding means including one way transfer means which connects said feeding means to said printing means to transfer the power for moving said printing head to said feeding means only when said printing head moves in one direction.

6. An apparatus according to claim 5, further comprising a common motor for driving said printing head and said paper feeding means.

7. An apparatus according to claim 5 or 6, wherein said paper feeding means feeds the recording paper sheet when said printing head is moved in a predetermined range of the width of the recording paper sheet, and said paper feeding means has means for press-contacting the recording paper sheet with said printing head and said paper feeding means, wherein the center of pressure of said press-contacting means is substantially at a center of the predetermined range.

* * * * *